Patented Jan. 25, 1938

2,106,519

UNITED STATES PATENT OFFICE 2,106,519

MANUFACTURE OF COLORED LACQUERS AND FILM-FORMING COATINGS

Achille Conzetti, Basel, Switzerland, assignor to firm of J. R. Geigy A. G., Basel, Switzerland No Drawing. Application October 23, 1935, Serial No. 46,444. In Germany February 1, 1934

21 Claims. (Cl. 134—79)

This invention is an improvement in or a modification of that described in the specification of the U. S. patent application No. 702,097, filed December 12, 1933.

The process of that specification consists in a production of colored lacquers and film-forming coating compositions, wherein a leuco-compound or finished dyestuff of the triarylmethane-series containing a group or groups capable of combining with mordants is dissolved in a lacquer to be colored and is developed by means of chromic acid or a salt thereof to the colored chromium-compound.

In the specification of my U. S. patent application, Ser. No. 42,136, filed on 25th day of September 1935, this reaction is extended to other metals for producing colored lacquers containing metal-dyestuff-complexes.

The present invention is based on the observation that the process is applicable also to azo-dyestuffs which contain one or more groups capable of combining with a mordant and therefore being able of forming complex metal salts. It is known that azo-dystuffs can be converted into the metal complexes of the dyestuff particularly in aqueous solution, by treatment with agents furnishing the metal-complex-component. The reaction, however, differs from case to case. It is common to all the processes to make the metal-dyestuff-complex as a first operation and then to isolate it, which is mostly difficult or costly.

In contrast, it is very surprising that in the present invention the metal complex of the mordant-dyeing azo-dyestuff is developed in the lacquer itself, namely by dissolving a suitable dyestuff in the lacquer and converting it into the metal complex in the finished lacquer by gently warming. For the process both azo-dyestuffs with groups capable of being mordanted are suitable, whether soluble or insoluble in water.

The water-soluble dyestuffs may be applied in the form of their free dyestuff acid or of a salt. The use of a soluble dyestuff or an insoluble dyestuff depends largely on the composition of the lacquer. If the original lacquer has not been made on the base of lower alcohols, but, as in the modern industry, with higher alcohols, esters or softening agents, it may happen that various acid azo-dyestuffs, both in the form of the dyestuff-acid or of a salt, are sparingly soluble in the lacquer to be colored. In these cases it is recommended to avoid the presence of one or more sulpho-groups in the dyestuff molecule which lend solubility in water. These water-insoluble dyestuffs are almost without exception freely soluble in all usual lacquer mixtures, such as a nitro-cellulose and acetyl-cellulose lacquers, and yield after development of the metal complex a completely clear colored lacquer ready for use.

In Example 4 of British specification No. 241,214 there is described a process for coloring caoutchouc by precipitating in an aqueous emulsion of the caoutchouc a dyestuff as a lake in the form of its metal compound. However, in that example a true insoluble dyestuff-metal-salt (pigment) in which the metal is bound as an ion is involved; this is fundamentally different from the dyestuff-metal-complexes with complex bound metal of the present process. Furthermore, chlorinated rubber, for instance, is so different from caoutchouc in its properties that a process for coloring caoutchouc could not be transferred without fundamental changes to the production of transparent colored lacquers on the base of chlorinated rubber.

It is advantageous to conduct the process in such a manner that the azo-dyestuff being able of forming complexes is mixed in the form of dry powder with the metal salt, particularly sodium bichromate. By gently heating, this mixture is dissolved in the lacquer to be colored and the colored metal complex of the dyestuff is formed in a short time. The conditions to be observed differ from case to case according to the dyestuff and the metal, and therefore must always be adapted for each individual case. The quantity of agent furnishing the metal-complex-component necessary for the formation of the lacquer depends on the constitution of the dyestuff used and must be ascertained by a preliminary test. In some cases it suffices to dissolve the components in the lacquer to be colored at the temperature of the room. In most cases, however, it is advisable to support dissolution and lacquer formation by gently warming.

Metals useful for the invention are all those which are used in the dye technics for the formation of complex dyestuff metal salts, particularly chromium, in the form of chromic acid or its salts; also copper, nickel, cobalt, iron, each in the form of a salt. It may be mentioned that these small quantities of metal salts are without influence on the properties of the finished coating compositions. The salts of the metals applied may be mixed as desired; it is also possible to mix with each other, without limit, the finished different fluid lacquers developed with various metal salts.

As lacquers may be used most film-forming lacquers and varnishes as they are listed in specification of U. S. patent application Ser. No. 702,097.

As dyestuffs may be used, among those that are water-soluble, all those which are applicable in the industry of producing mordant-dyeings. In the following examples some members of this group are described.

Of the dyestuffs insoluble in water there are especially applicable, for example, those selected from the following diazo- and azo-components:

| | Diazo-components | Azo-components |
|---|---|---|
| | Mono- and dichloro-anilines, ortho-amino-phenols, their substitution products and derivatives, such as: 3-amino-4-hydroxy-1-methyl-benzene, 5-nitro-3-amino-4-hydroxy-1-methyl-benzene, 4- and 5-nitro-2-amino-phenol, 4:6-dinitro-2-amino-phenol, chloro-2-amino-phenols, and the like. Ortho-amino-carboxylic acids, such as: 2-amino-benzoic acid, their nitro-derivatives, 3-amino-naphthoic acid-(2), ortho-hydroxy-carboxylic acid derivatives, such as amino-2-hydroxy-benzoic acids, alkylated ortho-hydroxydiazo-components and the like. | 4-hydroxy-1-methyl-benzene, 1:3-diamino-benzene and substitution products, 2-hydroxy-naphthalene, 2-amino-naphthalene, dihydroxynaphthalenes, 2-hydroxy-benzoic acid and homologues, 1:3-dihydroxy-benzene-carboxylic acids, ortho-hydroxynaphthalene-carboxylic acids, 3-amino-naphthoic acid-(2), di-hydroxy-quinoline, all compounds which contain a —CO.CH$_2$-group capable of coupling, like aceto-acetic ester and its derivatives, pyrazolone, sulphazone. |

The dyestuffs named in the following tables are used, for example, together with the agent yielding metal, in the proportions given in the subsequent table:

| Azo-dye-stuff | Diazo-component | Azo-component |
|---|---|---|
| Example No. | | |
| 1 | 3:5-dichloraniline | 2-hydroxy-benzoic acid. |
| 2 | 3:5-dichloraniline | 2-hydroxy-4-methyl-benzene-carboxylic acid-(1). |
| 3 | 4-nitro-amino-phenol | 1-phenyl-3-methyl-pyrazolone-(5). |
| 4 | 2-amino-benzoic acid | 2-hydroxy-naphthalene-carboxylic acid-(3). |
| 5 | 4-nitro-2-amino-phenol | 1:3-dihydroxy-benzene. |
| 6 | 3-amino-4-hydroxy-1-methyl-benzene | 1:3-dihydroxy-benzene. |
| 7 | 4-nitro-2-amino-phenol | 1:3-dihydroxy-quinoline. |
| 8 | 5-nitro-2-amino-phenol | 1:2-diamino-benzene. |
| 9 | 4-chloro-2-amino-phenol | 1:5-dihydroxy-naphthalene. |
| 10 | 4-chloro-2-amino-phenol | 1:3-dihydroxy-benzene. |
| 11 | 5-nitro-3-amino-4-hydroxy-1-methyl-benzene | Aceto-acetic ester. |

| Azo-dye-stuff | Diazo-component | Azo-component |
|---|---|---|
| Example No. | | |
| 12 | 4-chloro-2-amino-phenol | 2-aminonaphthalene. |
| 13 | 5-amino-2-hydroxy-benzoic acid | 2-hydroxy-benzoic acid. |
| 14 | 5-nitro-2-amino-phenol | 3-amino-naphthoic-acid-(2). |
| 15 | 4-chloro-6-amino-phenol-sulphonic acid-(2) | 1-phenyl-3-methyl-pyrazolone-(5). |
| 16 | 4-chloro-2-amino-phenol | 1-hydroxy-naphthalene-ct-sulphonic acid-(2:6). |
| 17 | 6-chloro-3-amino-benzene-sulphonic acid-(1) | 2-hydroxy-benzene-carboxylic acid-(1). |
| 18/24 | 4-chloro-2-amino-phenol | 1:5-dihydroxy-naphthalene. |
| 25/31 | 5-nitro-2-amino-4-hydroxy-1-methyl-benzene | 1:3-dihydroxy-benzene. |
| 32/38 | 4-nitro-2-amino-phenol | 1:2-dihydroxy-benzene. |
| 39/45 | 4-chloro-2-amino-phenol | 1:3-dihydroxy-benzene. |

| | Dyestuff | No. of dyestuff in Schultz Farbstofftabellen, 1931 |
|---|---|---|
| | | Number |
| 46 | Eriochrome-phosphine RR | 167. |
| 47 | Eriochrome-red G | 742. |
| 48 | Eriochrome-red B | 742. |
| 49/50 | Eriochrome-black T | 241. |
| 51/2 | Dye of U. S. specification No. 1,888,002, Example 2. | |
| 53/4 | Eriochrome-violet 3 B | 238. |
| 55 | Eriochrome blue-black B | 239. |
| 56 | Dye of U. S. specification No. 1,888,002, Example 2. | |
| 57 | Eriochrome-phosphine RR | 167. |
| 58 | Eriochrome-red G | 742. |
| 59 | Eriochrome-black T | 241. |

*Example*

There are dissolved in 100 parts by weight of lacquer $x$ parts of azo-dyestuff and the colour is developed by gently warming the lacquer with $y$ parts of the metal salt or acid.

| Example No. | $x$ | Initial lacquer | $y$ | Metal salt or acid | Tint | Fastness to light |
|---|---|---|---|---|---|---|
| 1 | 0.4 | Artificial resin lacquer | 0.2 | Na$_2$Cr$_2$O$_7$ or CrO$_3$ | Yellow | Excellent. |
| 2 | 0.4 | Spirit-lacquer | 0.2 | do | Gold-yellow | Very good. |
| 3 | 0.4 | Acetyl-cellulose lacquer | 0.2 | do | Yellow-brown | Do. |
| 4 | 0.4 | Nitro-cellulose lacquer | 0.2 | do | Blue-red | Excellent. |
| 5 | 0.4 | Chloro-caoutchouc lacquer | 0.2 | do | Red-brown | Do. |
| 6 | 0.4 | Spirit-lacquer | 0.2 | do | Dark red | Good. |
| 7 | 0.4 | Acetylene-cellulose lacquer | 0.2 | do | Brown-red | Excellent. |
| 8 | 0.8 | Nitro-cellulose lacquer | 0.4 | do | Deep-black | Good. |
| 9 | 0.8 | Spirit-lacquer | 0.4 | do | Deep-blue-black | Do. |
| 10 | 0.4 | Acetyl-cellulose lacquer | 0.2 | do | Dark brown | Excellent. |
| 11 | 0.4 | Nitro-cellulose lacquer | 0.2 | do | Reddish-brown | Good. |
| 12 | 0.4 | do | 0.2 | do | Green | Do. |
| 13 | 0.5 | do | 0.5 | do | Greenish-yellow | Do. |
| 14 | 0.4 | do | 0.2 | do | Green | Do |
| 15 | 1 | do | 0.5 | do | Yellowish red | Very good. |
| 16 | 1 | do | 0.5 | do | Violet | Do. |
| 17 | 1 | do | 0.5 | do | Yellow | Do. |
| 18 | 0.4 | Acetyl-cellulose lacquer | 0.2 | Nickel acetate | Dark-brown | Good. |
| 19 | 0.4 | do | 0.2 | Cobalt acetate | Black-brown | Do. |
| 20 | 0.4 | do | 0.2 | Ferro-sulphate + sodium acetate. | Dark-brown | Do. |
| 21 | 0.4 | Nitro-cellulose lacquer | 0.2 | Nickel-acetate | Wine-red | Do. |
| 22 | 0.4 | do | 0.2 | Cobalt-acetate | Violet | Do. |
| 23 | 0.4 | do | 0.2 | Ferro-sulphate + sodium acetate. | Brown | Do. |
| 24 | 0.4 | do | 0.2 | Copper acetate | Blue-violet | Do. |
| 25 | 0.4 | Acetyl-cellulose lacquer | 0.2 | Nickel-acetate | Reddish brown | Do. |
| 26 | 0.4 | do | 0.2 | Cobalt acetate | Dark-brown | Do. |
| 27 | 0.4 | do | 0.2 | Ferro-sulphate + sodium acetate. | Brown | Do. |
| 28 | 0.4 | Nitro-cellulose lacquer | 0.2 | Nickel acetate | Yellow brown | Do. |
| 29 | 0.4 | do | 0.2 | Cobalt acetate | Dark red-brown | Do. |
| 30 | 0.4 | do | 0.2 | Ferro-sulphate + sodium acetate. | Dark brown | Do. |
| 31 | 0.4 | do | 0.2 | Copper acetate | Reddish-brown | Do. |
| 32 | 0.4 | Acetyl-cellulose lacquer | 0.2 | Nickel acetate | Orange | Do. |
| 33 | 0.4 | do | 0.2 | Cobalt acetate | Light brown | Do. |
| 34 | 0.4 | do | 0.2 | Ferro-sulphate + sodium acetate. | Dark brown | Do. |
| 35 | 0.4 | Nitro-cellulose lacquer | 0.2 | Nickel acetate | Yellow-orange | Do. |
| 36 | 0.4 | do | 0.2 | Cobalt acetate | Scarlet-red | Do. |
| 37 | 0.4 | do | 0.2 | Ferro-sulphate + sodium acetate. | Light-brown | Do. |

| Example No. | x | Initial lacquer | y | Metal salt or acid | Tint | Fastness to light |
|---|---|---|---|---|---|---|
| 38 | 0.4 | Nitro-cellulose lacquer | 0.2 | Copper acetate | Orange-yellow | Good. |
| 39 | 0.4 | Acetyl-cellulose lacquer | 0.2 | Nickel acetate | Reddish-yellow | Do. |
| 40 | 0.4 | ...do... | 0.2 | Cobalt acetate | Red-brown | Do. |
| 41 | 0.4 | ...do... | 0.2 | Ferro-sulphate + sodium acetate. | Dark-brown | Do. |
| 42 | 0.4 | Nitro-cellulose lacquer | 0.2 | Nickel acetate | Orange-yellow | Do. |
| 43 | 0.4 | ...do... | 0.2 | Cobalt acetate | Red | Do. |
| 44 | 0.4 | ...do... | 0.2 | Ferro-sulphate+sodium acetate. | Olive-brown | Do. |
| 45 | 0.4 | ...do... | 0.2 | Copper acetate | Orange-yellow | Do. |
| 46 | 1 | ...do... | 0.5 | Na₂Cr₂O₇ or CrO₃ | Yellowish-red | Do. |
| 47 | 1 | Acetyl-cellulose lacquer | 0.5 | ...do... | Red | Do. |
| 48 | 1 | Nitro-cellulose lacquer | 0.5 | ...do... | Blue-red | Do. |
| 49 | 2 | Gelatine solution (with addition of a small quantity of acetic acid). | 1 | ...do... | Deep-black | Very good. |
| 50 | 2 | Chloro-caoutchouc lacquer. | 1 | ...do... | ...do... | Do. |
| 51 | 0.5 | Resin-spirit-lacquer | 0.25 | ...do... | Blue | Do. |
| 52 | 0.5 | Artificial resin lacquer | 0.25 | ...do... | ...do... | Good. |
| 53 | 1 | Nitro-cellulose lacquer | 0.5 | ...do... | Violet | Do. |
| 54 | 1 | Acetyl-cellulose lacquer | 0.5 | ...do... | ...do... | Do. |
| 55 | 2 | Resin-spirit lacquer | 1 | ...do... | Blue-black | Do. |
| 56 | 0.6 | Nitro-cellulose lacquer | 0.45 | Copper acetate | Deep-black | Do. |
| 57 | 0.9 | ...do... | 0.45 | ...do... | Yellow-brown | Do. |
| 58 | 1.2 | ...do... | 0.6 | ...do... | Red-orange | Do. |
| 59 | 1.2 | ...do... | 0.6 | Nickel-acetate | Deep violet-brown | Do. |

What I claim is:—

1. A process for the manufacture of a colored composition comprising treating a hydroxymonoazodyestuff in presence of a lacquer constituent selected from the group consisting of cellulose derivatives, artificial and natural resins, chlorocaoutchouc and gelatine with a compound of the group consisting of chromic acid, alkali bichromate, and acetates of Fe, Cu, Co and Ni.

2. A process for the manufacture of a colored composition comprising treating an ortho-hydroxymonoazodyestuff having an OH-group in ortho-position to the azo-group, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

3. A process for the manufacture of a colored composition comprising treating a para-hydroxymonoazodyestuff having an OH-group in para-position to the azo-group, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

4. A process for the manufacture of a colored composition comprising treating an ortho-hydroxymonoazo-dyestuff of the general formula

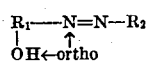

wherein R₁ represents the benzene nucleus of the diazo-component and R₂ the radical of an azo coupling component selected from the group consisting of benzene, naphthalene, quinoline, acetoacetic esters and pyrazolone radicals, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

5. A process for the manufacture of a colored composition comprising treating an ortho-hydroxymonoazo-dyestuff of the general formula

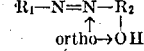

wherein R₁ represents the benzene radical of the diazo-component and R₂ the radical of a para-substituted azo coupling component selected from the group consisting of benzene, naphthalene and quinoline radicals, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

6. A process for the manufacture of a colored composition comprising treating a hydroxymonoazo-dyestuff of the general formula

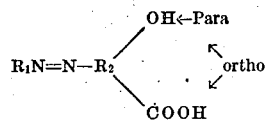

wherein R₁ represents the benzene radical of the diazo-component and R₂ the radical of an azo coupling component selected from the group consisting of benzene and naphthalene radicals, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

7. A process for the manufacture of a colored composition comprising treating an ortho-hydroxymonoazo-dyestuff of the general formula

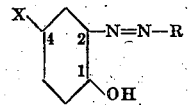

wherein R represents the radical of an azo coupling component selected from the group consisting of benzene, naphthalene, quinoline, acetoacetic esters and pyrazolone radicals and X represents a member of the group consisting of halogen and nitro, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

8. A process for the manufacture of a colored composition comprising treating an ortho-hydroxymonoazo-dyestuff of the general formula

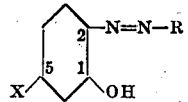

wherein R represents the radical of an azo coupling component selected from the group consisting of benzene, naphthalene, quinoline, acetoacetic esters and pyrazolone radicals and X represents a member of the group consisting of halogen and nitro, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

9. A process for the manufacture of a colored composition comprising treating a hydroxymonoazo-dyestuff in presence of a lacquer constituent selected from the group consisting of cellulose derivatives, artificial and natural resins, chloro-caoutchouc and gelatine with sodium bichromate.

10. A process for the manufacture of a colored composition comprising treating a hydroxymonoazo-dyestuff in presence of a lacquer constituent selected from the group consisting of cellulose derivatives, artificial and natural resins, chloro-caoutchouc and gelatine with cobalt acetate.

11. A process for the manufacture of a colored composition comprising treating a hydroxymonoazo-dyestuff in presence of a lacquer constituent selected from the group consisting of cellulose derivatives, artificial and natural resins, chloro-caoutchouc and gelatine with copper acetate.

12. A process for the manufacture of a colored composition comprising treating an ortho-hydroxymonoazo-dyestuff made by coupling diazotized 4-nitro-amino-phenol with 1:3-dihydroxy-quinoline, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

13. A process for the manufacture of a colored composition comprising treating an ortho-hydroxymonoazo-dyestuff made by coupling diazotized 3-chloro-aniline with 2-hydroxy-benzoic acid, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

14. A process for the manufacture of a colored composition comprising treating an ortho-hydroxymonoazo-dyestuff made by coupling diazotized 5-nitro-2-amino-phenol with 1:3-diamino-benzene, in presence of a lacquer constituent selected from the group consisting of cellulose derivatives, artificial and natural resins, chloro-caoutchouc and gelatine with a compound of the group consisting of chromic acid, alkali bichromate, and acetates of Fe, Cu, Co and Ni.

15. A process for the manufacture of a colored composition comprising treating an ortho-hydroxymonoazo-dyestuff made by coupling diazotized 4-nitro-aminophenol with 1:3-dihydroxy-quinoline, in presence of a lacquer constituent selected from the group consisting of cellulose derivatives, artificial and natural resins, chloro-caoutchouc and gelatine with sodium bichromate.

16. A process for the manufacture of a colored composition comprising treating an ortho-hydroxymonoazo-dyestuff made by coupling diazotized 3-chloro-aniline with 2-hydroxy-benzoic acid, in presence of a lacquer constituent selected from the group consisting of cellulose derivatives, artificial and natural resins, chloro-caoutchouc and gelatine with sodium bichromate.

17. A process for the manufacture of a colored composition comprising treating a monoazo-dyestuff made by coupling diazotized 5-nitro-2-amino-phenol with 1:3-diamino-benzene, in presence of a lacquer constituent selected from the group consisting of cellulose derivatives, artificial and natural resins, chloro-caoutchouc and gelatine with sodium bichromate.

18. A process for the manufacture of a colored composition comprising treating an ortho-hydroxymonoazo-dyestuff made by coupling diazotized 4-nitro-aminophenol with 1:3-dihydroxy-quinoline, in presence of acetylcellulose with sodium bichromate.

19. A process for the manufacture of a colored composition comprising treating an ortho-hydroxymonoazo-dyestuff made by coupling diazotized 3-chloro-aniline with 2-hydroxy-benzoic acid, in presence of acetylcellulose with sodium bichromate.

20. A process for the manufacture of a colored composition comprising treating a monoazo-dyestuff made by coupling diazotized 5-nitro-2-amino-phenol with 1:3-diamino-benzene, in presence of nitrocellulose with sodium bichromate.

21. The colored compositions comprising a lacquer constituent selected from the group consisting of cellulose derivatives, artificial and natural resins, chloro-caoutchouc and gelatine, and a complex metallic derivative of a hydroxymonoazo-dyestuff, the metal component being a member of the group consisting of Cr, Fe, Cu, Co and Ni, said compositions being soluble with intense, bright colorations in esters of organic acids and phenols used for the preparation of lacquers and mixtures thereof.

ACHILLE CONZETTI.